H. A. HUBSCHMITT, Jr.
ROUTE INDICATOR FOR AUTOMOBILES.
APPLICATION FILED OCT. 19, 1916.
1,236,565.
Patented Aug. 14, 1917.
2 SHEETS—SHEET 1.
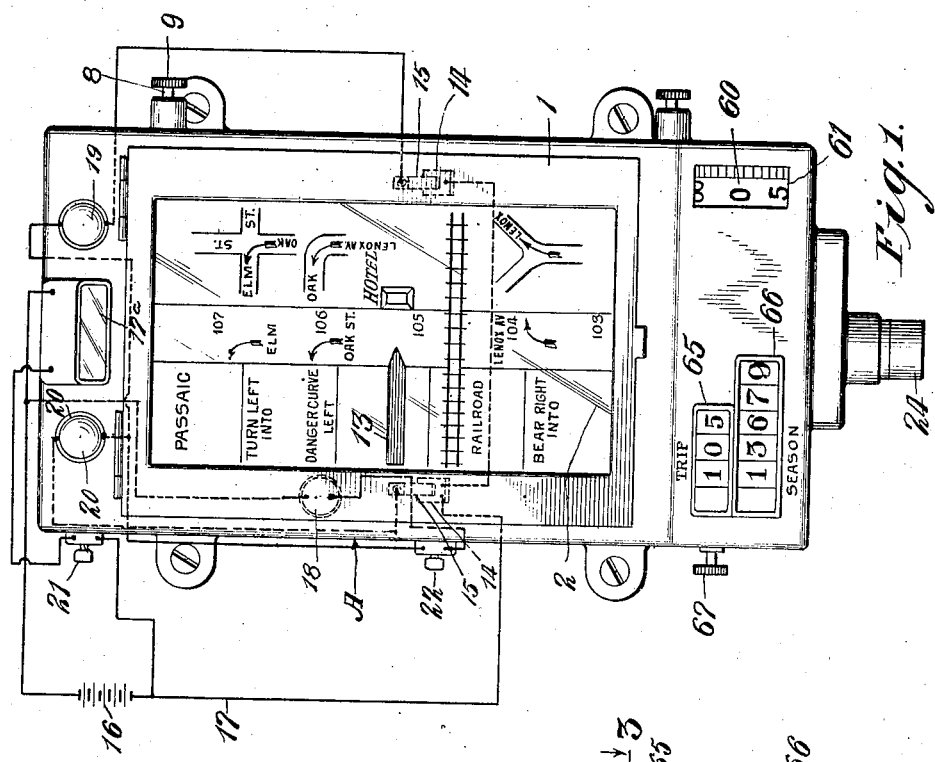
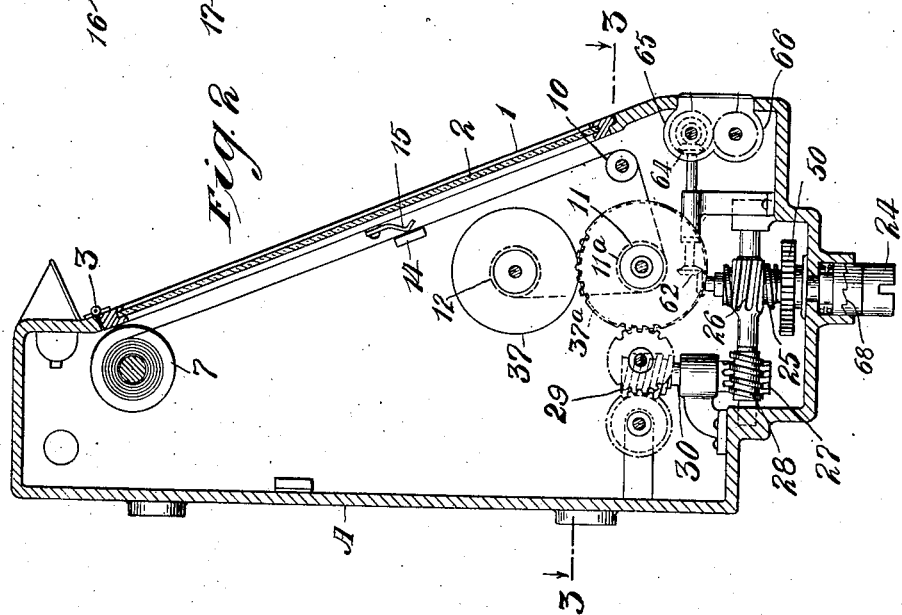
INVENTOR
Henry A. Hubschmitt Jr.
BY
William P. Hammond
ATTORNEY H. A. HUBSCHMITT, Jr.
ROUTE INDICATOR FOR AUTOMOBILES.
APPLICATION FILED OCT. 19, 1916.
1,236,565.
Patented Aug. 14, 1917.
2 SHEETS—SHEET 2.
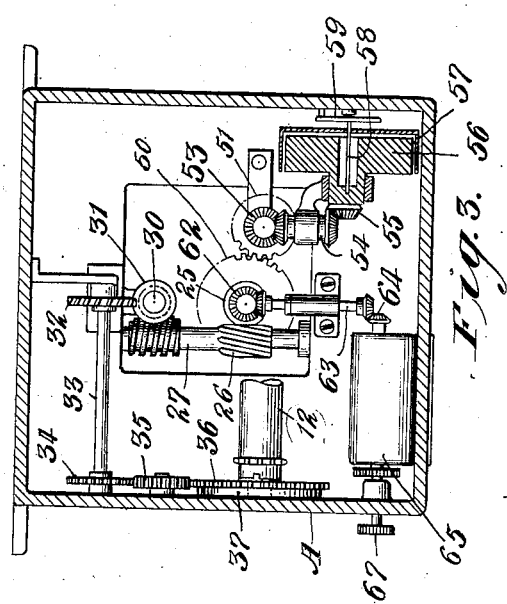
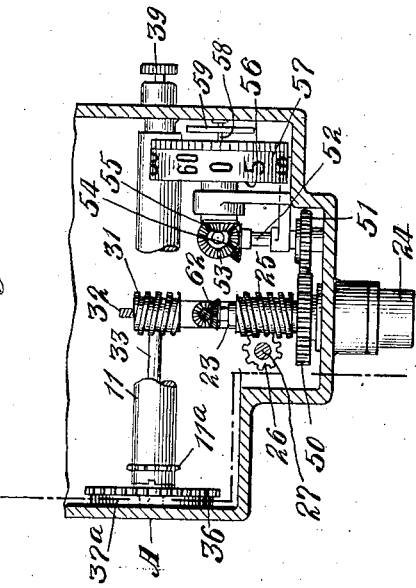
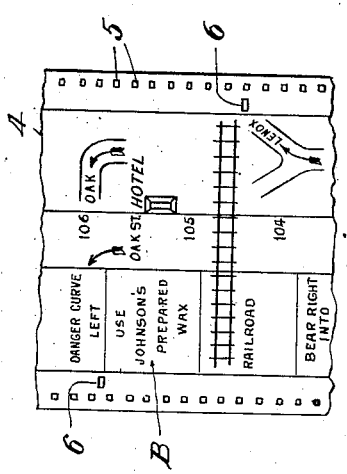
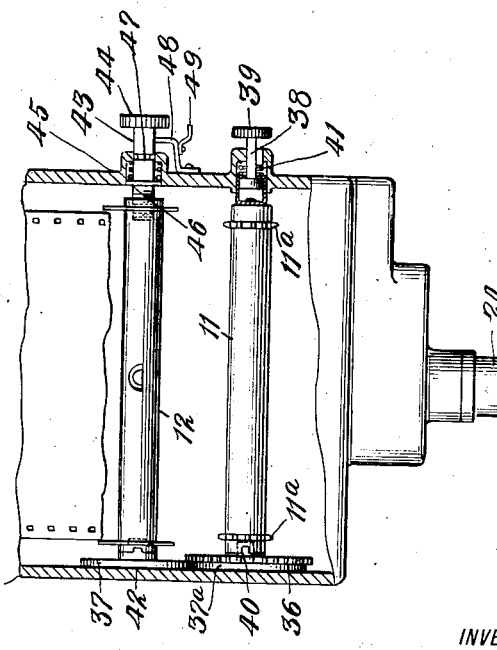
INVENTOR
Henry A. Hubschmitt Jr.
BY
ATTORNEY

UNITED STATES PATENT OFFICE.

HENRY A. HUBSCHMITT, JR., OF PASSAIC, NEW JERSEY.

ROUTE-INDICATOR FOR AUTOMOBILES.

1,236,565.  Specification of Letters Patent.  Patented Aug. 14, 1917.

Application filed October 19, 1916. Serial No. 126,512.

*To all whom it may concern:*

Be it known that I, HENRY A. HUBSCHMITT, Jr., a citizen of the United States, residing in Passaic, in the county of Passaic and State of New Jersey, have invented certain new and useful Improvements in Route-Indicators for Automobiles, of which the following is a specification.

The present invention relates to a combination route indicator and speedometer for automobiles, and has for its object to provide a device of this character which can be readily mounted in a convenient position upon the vehicle, and which embodies novel features of construction for moving a ribbon map or route guide in synchronism with the movement of the vehicle and give timely warnings of dangerous places and turns.

Further objects of the invention are to provide a device of this character which can be readily substituted for the ordinary speedometer and attached to the upper end of the flexible speedometer driving shaft, which has a compact arrangement of parts and admits of the ribbon maps being readily changed for different routes, which makes provision for moving the ribbon map backwardly when such is desired, and which includes signals for giving timely warnings of dangerous places.

A still further object of my invention is to provide a new and improved ribbon map or route guide having a conveniently arranged system of road and direction indicia.

With these and other objects in view, I have illustrated in the accompanying drawings, one preferable embodiment of the principles of my invention and in which Figure 1 is a front elevation of a combination route indicator and speedometer constructed in accordance with the invention, the electric circuits for the light and signals being indicated diagrammatically.

Fig. 2 is a vertical sectional view through the device.

Fig. 3 is a horizontal sectional view on the line 3—3 of Fig. 2, looking downwardly in the direction of the arrows.

Fig. 4 is a vertical sectional view through the lower end of the device, taken on a plane at right angles to that of Fig. 2.

Fig. 5 is a front elevation of the lower portion of the device, the casing being broken away and portions of the driving gearing removed to show the lower winding spool and the toothed feed roller.

Fig. 6 is a detail view of a portion of the ribbon map.

Corresponding and like parts are referred to in the following description and indicated in all the views of the drawings by the same reference characters.

Referring to the drawings, the reference character A designates the casing within which the route indicator and speedometer mechanism are mounted, said casing preferably having an inclined front which is provided with a door 1, said door having a glass panel 2, and being hingedly connected to the casing at the upper edge thereof, as indicated at 3. The ribbon map 4 is provided with suitable characters and diagrams to indicate the mileage, points of interest, railroad crossings, turns in the road, hotel locations, and the like, and may also carry advertising matter, if desired, as indicated at B. Each edge of the ribbon map 4 is provided with a series of perforations 5, and in addition to these perforations the edge portions of the map are provided with openings 6 located in a proper relation to danger points such as railroad crossings and sharp curves. In Fig. 6, the right hand opening 6 is positioned adjacent a railroad crossing, while the left hand opening 6 is located adjacent a sharp curve. The ribbon map is initially wound upon a spool 7 which is adapted to be inserted in position at the top of the casing A. For this purpose the door 1 is opened and a pivot opening in one end of the spool 7 caused to engage a fixed pin at one side of the casing, the pivot opening in the opposite end of the spool being engaged by a sliding pin 8 which is adapted to be manipulated from the exterior of the casing by a finger piece 9. The free end of the ribbon map 4 is drawn downwardly across the front of the casing and carried rearwardly around an idler 10 which is arranged at the lower end of the door opening in the front of the casing. From this idler 10 the ribbon map passes rearwardly around the feed roller 11, the perforations 5 of the map engaging the teeth 11ᵃ of this roller, and the ribbon map extending upwardly from the feed roller 11 to the winding spool 12 upon which it is gradually wound, suitable gearing being provided, as will be hereinafter described, for moving the ribbon map in exact synchronism with the movements of the vehicle upon the road.

A pointer 13 indicates the exact position of the vehicle on the road map, said pointer being carried by the glass door or otherwise suitably mounted. Contact plates 14 are arranged under opposite edge portions of the ribbon map 4, while corresponding spring contact fingers 15 press against the top of the ribbon map, the two members 14 and 15 being normally held out of contact with each other, but being permitted to contact through the before-mentioned openings 6 as the said openings are brought into position under the contact fingers. A battery 16, or other suitable source of energy, and suitable circuits 17, are provided for operating an illuminating lamp 17$^a$ at the top of the casing, as well as actuating a buzzer 18 and flashing a red lamp 19, or a green lamp 20, when one of the contact fingers 15 is permitted to engage the corresponding contact plate 14 through one of the openings 6. The buzzer 18 gives an audible signal whenever the circuit is closed through either set of contact members 14 and 15, and the red lamp 19 is flashed when the right hand set of contact members engage each other, while the green lamp 20 flashes when the left hand set of contact members engage each other. A suitable switch 21 is provided for controlling the light 17$^a$ which is arranged to illuminate the face of the instrument, while a switch 22 is provided for controlling the signal lamp and buzzer circuits. The switch 22 may be arranged to be operated so that the signal lamps and buzzer will be in a common circuit enabling them to be operated simultaneously as is desirable during night driving and which when thrown to another position will operate to cut the signal lamps out of circuit so that the buzzer only will sound as is desirable when driving in the day-time.

Extending vertically through the bottom of the casing A and journaled therein, is a drive shaft 23, the lower end of the shaft being provided with a head 24 which can be readily applied to the upper end of the regular flexible speedometer shaft, thereby providing an operative connection with a wheel or other movable part of the vehicle. This vertical shaft 23 is provided with a worm 25 which meshes with a worm gear 26 on a transverse shaft 27, said shaft being in turn provided with a worm 28 which meshes with a worm gear 29 on a vertical shaft 30, and this latter shaft being similarly provided with a worm 31 which meshes with a worm gear 32 on a transverse shaft 33 which is arranged at the rear of the casing A in a position above and at right angles to that of the first mentioned transverse shaft 27. At the side of the casing the upper transverse shaft 33 is provided with a pinion 34 which meshes with an idler 35, said idler in turn meshing with a gear wheel 36 which has a clutch connection with the toothed feed roller 11. This gear 36 is provided with a hub 37$^a$ which engages with and frictionally drives a wheel 37 which has a similar clutch connection with the winding spool 12. With this construction, it will be obvious that as the vehicle travels along the road, motion will be transmitted through the train of gearing to the gear wheel 36 and frictionally driven wheel 37 which have clutch connections with the feed roll 11 and winding spool 12, respectively, the ratio between the gear and wheel being such that the movements of the ribbon map are in exact synchronism with the movements of the vehicle upon the road.

The right hand end of the feed roller 11 has a swivel connection with a sliding stem 38 which terminates on the exterior of the casing in a finger piece 39. By pulling outwardly upon this finger piece the clutch connection 40 between the feeding roller 11 and the gear wheel 36 can be broken, thereby admitting of the ribbon map being wound backwardly, if desired. A spring 41 which surrounds the sliding stem 38 normally tends to force the feed roller 11 toward the gear wheel 36 so as to maintain the clutch connection between the two members. The winding spool 12 is removable, one end thereof having a clutch connection 42 with the gear wheel 37, while the opposite end thereof is engaged by one end of a sliding stem 43 which terminates on the exterior of the casing in a finger piece 44. A spring 45 which surrounds the stem 43 bears against a collar 46 thereon and normally tends to slide the stem inwardly into operative position. When the stem is drawn outwardly for the purpose of removing or inserting the winding roller 12 an annular groove 47 therein is engaged by a spring latch member 48, thereby locking the stem in a retracted position. A finger piece 49 upon the latch member 48 admits of the latter being swung outwardly and disengaged from the groove 47 when it is desired to release the sliding stem 43.

The vertical drive shaft 23 is provided at a point just below the worm 25 with a gear wheel 50 which meshes with a pinion 51 on a vertical shaft 52, the upper end of the said vertical shaft being connected by the bevel gearing 53 to a horizontal shaft 54. The opposite end of this shaft 54 is in turn connected by the bevel gearing 55 to the hub of a magnetic disk 56 which rotates within a dial disk 57, said disk being rigid with a shaft 58 which is engaged by one end of a spiral spring 59, the opposite end of the said spring being secured to the casing. As the disk 56 rotates a magnetic drag is produced upon the dial disk 57 and the latter caused to turn against the action of the spring 59. The amount of this turning depends upon the speed at which the disk 56 is rotated, and as the dial disk turns the characters 60 thereon play across a view opening 61 in one side of the bottom of the casing.

The upper end of the vertical drive shaft 23 is connected by bevel gearing 62 to a transverse shaft 63, the opposite end of the shaft 63 being connected by the bevel gearing 64 to the usual odometers, 65 designating the "trip" odometer, while 66 designates the "season" odometer. The usual finger piece 67 is provided for resetting the "trip" odometer. This device is designed to be substituted for the ordinary speedometer and to be directly attached to the upper end of the flexible speedometer shaft. In order to prevent any disarrangement of the gearing of the instrument or ribbon map, in the event of backward movement of the vehicle, the speedometer shaft is provided with a one-way clutch 68, so that the instrument will operate only when the vehicle is moving in a forward direction.

As before alluded to, one of the important features of my invention resides in the form in which my route indicating map finds embodiment. It will be observed that the central or longitudinal zone of the ribbon is bounded by a pair of parallel lines, the space between which is representative of the road being traveled by the machine. To the right of this marked-off zone appears indicating symbols of roadways showing characteristics thereof, such as intersecting roads, curves and danger points and direction indicating arrows, which inform the driver of the particular road to be taken by him when traveling a given route. These road indications bear a fixed relationship to the centrally-located zone upon which appear the names of the various streets and avenues in the route that the machine is to travel. It will be observed that the road characteristics represented by the symbols laterally of the marked-off zone bear the names of the streets and avenues, which are common to the names of the streets and avenues which appear on the centrally marked-off zone so that the arrow which indicates the position of the vehicle will always indicate the particular avenue or road that the machine is traveling as the route ribbon is automatically moved downwardly over the face of the instrument.

I do not wish to be limited in the matter of details of the illustrated embodiment of the principles of my invention as changes may be resorted to without departing from the spirit and scope thereof as defined by the following claims.

Having thus described the invention, what I claim as new and desire to secure by Letters Patent, is:—

1. A route indicator for vehicles, including a ribbon map formed with a longitudinally extending series of perforations, a spool carrying the ribbon map, a winding spool, a toothed feed roll arranged to engage the perforations of the ribbon map at a point between the ribbon carrying spool and the winding spool, a gear operatively connected to the feed roll and formed with a hub, a smooth wheel operatively applied to the winding spool and frictionally engaging the hub of the gear, and driving means connected to the gear of the feed roll.

2. A route indicator for vehicles, including a ribbon map formed with a longitudinally extending series of perforations, a spool carrying the ribbon map, a winding spool, a toothed feed roll arranged to engage the perforations of the ribbon map, a gear having a clutch connection with the feed roll and formed with a hub, a smooth wheel having a clutch connection with the winding spool and frictionally engaging the hub of the gear, means for breaking the said clutch connections and moving the ribbon map backward, and driving means operatively connected to the gear wheel of the feed roll.

3. A route indicator for vehicles, including a ribbon map formed with a longitudinally extending series of perforations, a spool carrying the ribbon map, a longitudinally movable winding spool, a longitudinally movable toothed feed roll arranged to engage the perforations of the ribbon map, a gear arranged at one end of the toothed feed roll and having a clutch connection therewith, said gear being formed with a hub, a spring tending to move the feed roll toward the gear to close the clutch connection, a smooth wheel arranged at one end of the winding spool and frictionally engaging the hub of the gear, said smooth wheel having a clutch connection with the winding spool, a spring for moving the winding spool toward the smooth wheel to close the clutch connection, and driving means operatively connected to the gear of the feed roll.

HENRY A. HUBSCHMITT, Jr.